G. A. CURTIS.
WIRE NAIL.
APPLICATION FILED MAY 5, 1916.

1,200,594.

Patented Oct. 10, 1916.

INVENTOR:
George A. Curtis
by Hughes Brown Quimby May
ATT'YS.

UNITED STATES PATENT OFFICE.

GEORGE A. CURTIS, OF MEDFORD, MASSACHUSETTS.

WIRE NAIL.

1,200,594.  Specification of Letters Patent.  Patented Oct. 10, 1916.

Application filed May 5, 1916. Serial No. 95,675.

*To all whom it may concern:*

Be it known that I, GEORGE A. CURTIS, a citizen of the United States, residing at Medford, in the county of Middlesex and State of Massachusetts, have invented new and useful Improvements in Wire Nails, of which the following is a specification.

This invention relates to nails made from cylindrical wire, and provided with shank or body portions the diameter of which is the same as that of the wire, and with penetrating outer ends or points.

The object of the invention is to enable a wire nail to be firmly anchored in the body into which it is driven, without clenching the penetrating end of the nail, and to provide a non-clenching and self-anchoring wire nail adapted to be rapidly and economically manufactured.

The invention consists in the improvements hereinafter described and claimed.

Figure 1:
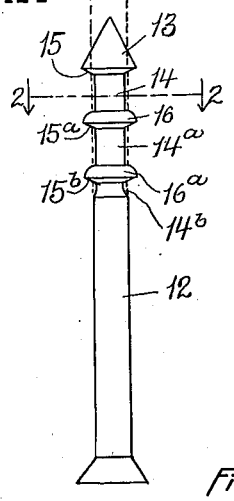
Figure 2:
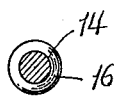
Figure 3:
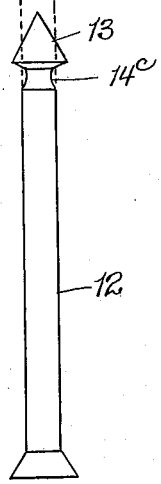
Figure 8:
Figure 4:
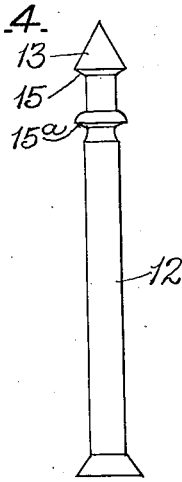
Figure 7:
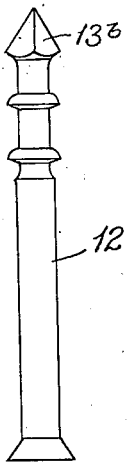
Figure 5:
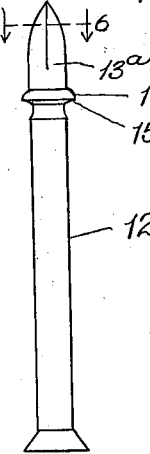
Figure 6:
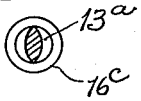

Of the accompanying drawings forming a part of this specification:— Figure 1 represents a side view of a wire nail embodying my invention; Fig. 2 represents a section on line 2—2 of Fig. 1; Figs. 3, 4, and 5 represent side views of different embodiments of the invention; Fig. 6 represents a section on line 6—6 of Fig. 5; Fig. 7 represents a side view of a nail having a pyramidal penetrating terminal; Fig. 8 represents an end view of the nail shown by Fig. 7.

The same reference characters indicate the same or similar parts in all the views.

My improved nail is made from a length or blank of cylindrical wire, and when said nail is to be used for attaching rubber heels to boots and shoes, which is the chief purpose for which the invention is intended, the nail will usually be of about one quarter of the size shown by the drawings.

The shank or body portion 12 of the nail is cylindrical and of the same diameter as that of the wire of which the nail is made, and its outer portion is treated by suitable dies to form a penetrating terminal having a tapered pointed body 13, and an annular inwardly facing anchoring shoulder 15, said shoulder facing inwardly or toward the head of the nail and being adapted to engage a body of leather or other material into which the nail is driven in such manner as to strongly resist the removal of the nail. The dies which form said terminal and shoulder also form a reduced substantially cylindrical zone 14 of smaller diameter than the shank, adjoining the said shoulder, the latter being formed by metal displaced in forming the reduced zone. The said annular anchoring shoulder joins the reduced zone so that said face is relatively wide.

The outer margin of the shoulder 15 is of greater diameter than the shank 12, and the substantially cylindrical zone 14 and the inner margin of the shoulder 15 are of smaller diameter than the shank. The length of the reduced zone 14 in the direction of the axis of the nail is substantially equal to its diameter, so that said zone is formed to permit the contraction, into engagement with the shoulder 15, of a portion of the leather body of sufficient width to firmly hold the driven nail. A single shoulder, as shown by Figs. 3 and 5, is therefore sufficient to anchor the nail in a leather body, so that a nail with one shoulder may be successfully used to secure a rubber heel of such height that there is not room on the nail for more than one shoulder. If desired, however, the nail may be provided with enlargements 16 and 16$^a$ having shoulders 15$^a$ and 15$^b$, and with additional reduced zones 14$^a$ and 14$^b$, as shown by Fig. 1. The nail shown by Fig. 4 has two inwardly facing shoulders 15 and 15$^a$ and two reduced zones.

Each of the nails formed as described is adapted to be produced by suitable dies, portions of the metal displaced in forming the reduced zones being redistributed to form the anchoring shoulders.

Figs. 5 and 6 show a nail the penetrating terminal of which has a body 13$^a$ formed as a clenching point, and having an enlargement 16$^c$ at its base and an inwardly facing anchoring shoulder 15$^c$, a reduced zone being formed at the inner side of said shoulder.

The body 13$^a$, although having the form of a clenching point, does not require to be bent or clenched in driving the nail.

The penetrating portion of the nail may have a tapering body 13$^b$ of pyramidal form, as shown by Figs. 7 and 8.

Having described my invention, I claim:

A wire nail comprising a cylindrical shank portion, a reduced substantially cylindrical zone at the outer end of the shank portion, and a penetrating terminal having a tapered pointed body and an annular inwardly facing anchoring shoulder connecting the margin of its base with said reduced zone, the outer margin of said shoulder being of greater diameter and its inner margin of smaller diameter than the shank, and the length of said reduced zone in the direction of the axis of the nail being substantially equal to its diameter so that said zone is formed to permit the contraction, into engagement with said shoulder, of a portion of a compressible body of sufficient width to firmly hold the driven nail.

In testimony whereof I have affixed my signature.

GEORGE A. CURTIS.